Aug. 23, 1960  R. S. LUCE  2,949,884
EGG INCUBATOR TRAY
Filed June 18, 1958

Ronald S. Luce
INVENTOR.

BY *Clarence A. O'Brien*
*and Harvey B. Jacobson*
Attorneys

United States Patent Office 2,949,884
Patented Aug. 23, 1960

2,949,884

EGG INCUBATOR TRAY

Ronald S. Luce, Columbia Falls, Mont.

Filed June 18, 1958, Ser. No. 742,883

4 Claims. (Cl. 119—44)

This invention relates to incubators and more particularly to an egg tray for any commercial incubator.

The purpose of the invention is to provide a device that will at all times during the first eighteen days of incubation, maintain the eggs in a natural position, that is, on their sides. Many commercially available trays that provide for automatic turning, do so by placing the eggs on end, which is an unnatural position. It has been found that the optimum position for the eggs is to have them on their sides with the small end of the eggs slightly lower than the larger end so that the air bubble in the egg will be at the larger end of the interior of the shell. If the large end of the egg is lower than the small end or if the egg is rolled end-for-end, the solids within the egg tend to break-down the air bubble, which results in the chicken failing to develop.

Accordingly, it is another object of the invention to provide an egg tray for use in a commercial egg incubator, the tray having means for supporting the eggs essentially on their sides but with the smaller end of the egg down slightly with respect to the larger end of the egg, while at the same time rotating the eggs gently about their longitudinal axes.

The invention is embodied in an egg incubator tray that has a plurality of rollers, each fashioned with an enlargement group on which there is a strip of belting or like material to form a seat for the larger end of the egg. Guides for the smaller ends of the eggs are regularly disposed between the egg rollers, and these preferably consist of malleable wire holders within which the smaller end of the eggs are supported. The result is that the egg when properly disposed on the egg tray, is supported on its side with the points of support being the holder at the small end of each egg and enlargements of two laterally spaced and adjacent enlargements on the rollers supporting the larger end of the egg. All rollers are rotated in the same direction and at the same speed.

It is preferred that the egg holders be slightly laterally spaced from the center line of the space between adjacent rollers so that each egg is canted slightly in a horizontal plane. This introduces a component of force as the rollers are rotated, the component of force being in a direction which tends to push the egg into the egg holder. This force is very small, but enough to keep the egg properly oriented on the incubator egg tray and in place within the egg holders.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
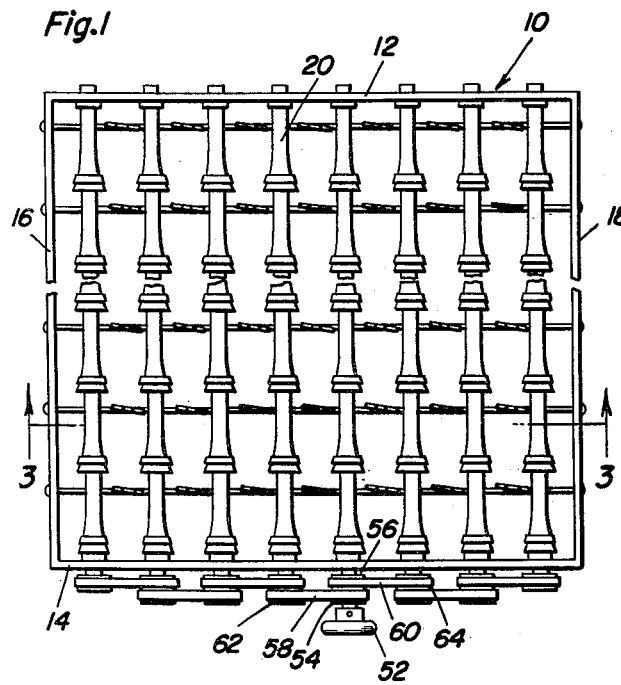
Figure 1 is a top view of an incubator egg tray characterizing the invention.
Figure 4:
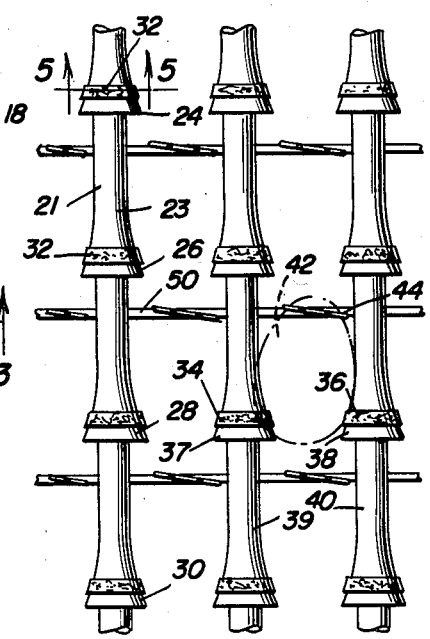
Figure 4 is a fragmentary plan view on an enlarged scale showing a part of the tray and one egg in a typical position on the tray.
Figure 2:
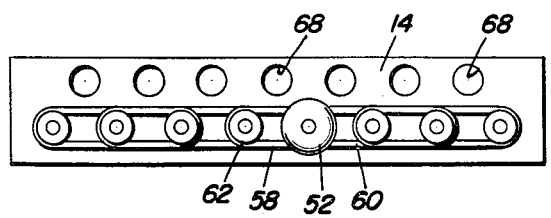
Figure 2 is an elevational view of the tray of Figure 1 showing the suggested means to drive the group of rollers.
Figure 5:
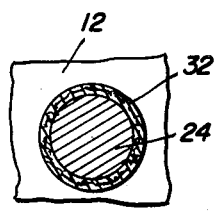
Figure 5 is an enlarged fragmentary sectional view taken on the line 5—5 of Figure 4 and showing the construction of one of the rollers.

In the accompanying drawings there is an egg tray 10 constructed in accordance with the invention. The egg tray has four sides 12, 14, 16 and 18 which form a frame having an open top and an open bottom. A group 20 of rollers is mounted in the frame, there being eight rollers in the group, although this number can be increased or decreased. Each roller is composed of an elongated spindle, for instance roller 21 in Figure 4 which has spindle 23. The spindle can be made of wood and has regularly spaced enlargements 24, 26, 28 and 30 (Figure 4). Each enlargement is formed by having the surface of the spindle smoothly and gradually increasing in distance from the longitudinal center of the spindle. The development of a portion of the wall in accordance with this definition yields a truncated cone and therefore enlargement 26 has the appearance of a truncated cone.

A band 32 of felt or other soft material, is attached to the surface of the enlargement 26 and a similar band is attached to the surface of all of the other enlargements of group 20 of rollers. Band 32 is circumferentially located on the spindle 23 and is in lateral parallel alignment with the bands on laterally adjacent enlargements of the laterally adjacent rollers. Two bands, for instance bands 34 and 36 on enlargements 37 and 38 of rollers 39 and 40, constitute the two-point contact supporting means for one egg 42 and specifically, for the larger end thereof.

The smaller end of egg 42 is supported by an egg holder 44 longitudinally spaced from bands 34 and 36 and laterally spaced from the longitudinal centerline of the space between adjacent rollers 39 and 40. The elevation of holder 44 is slightly lower than the average point of contact of bands 34 and 36 with the larger part of egg 42 so that the lower part of the egg is normally or ordinarily maintained slightly below the larger part of the egg. This achieves the previously stated result of assuring that the bubble within the egg shell be maintained at the larger end of the egg during rotation of the egg and in fact, all during the first eighteen days of incubation.

Figure 3:
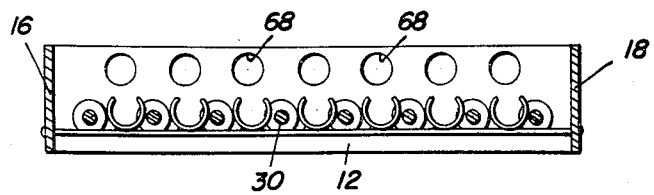
Figure 3 is a transverse sectional view taken on the line 3—3 of Figure 1.

Holder 44 is made of one arcuate, bendable wire attached at its center part to a transverse supporting wire 50 extending beneath the group 20 of rollers and attached to the sides 16 and 18 of the incubator frame. All holders are alike (Figure 3), and each holder is regularly spaced and located slightly to one side of the longitudinal centerline lying in a plane that contains the axes of rotation of all of the rollers in group 20 of rollers.

Although typical holder 44 is said to be made of one piece of wire, it is understood that modifications would include two pieces of wire, each soldered or otherwise joined to the supporting rod or wire 50. It is preferred, though, that the wire from which the egg holders 44 are made, be reasonably easily bendable so that the holders can be re-shaped from time to time for maximum efficiency or prolonging the life thereof.

All rollers are operated in unison and in one direction only. To achieve this a one-way ratchet drive (unshown) can be used in conjunction with a main drive pulley 52 attached to an end of one of the rollers that extends through a bearing opening in wall 14 of the incubator frame. An electric motor or some other source of power can be used to drive pulley 52 through the one-way clutch or ratchet. Two pulleys 54 and 56 are secured to the end of the roller which protrudes through side 14, and there are two belts 58 and 60 entrained over the pulleys 54 and 56. Belt 58 is engaged with a pulley 62 on an extension of the adjacent roller, while belt 60 is engaged with the pulley 64 on the end of another adjacent roller. The belting and pulleys for each of the rollers is merely duplicated to establish a complete drive for all of the rollers, causing them to rotate at the same speed, assuming all pulleys to have the same diameter, and in the same direction.

With the tray having a completely open top and bottom and with the tray having a large ventilation area in its sides, for instance by openings 68, there will be considerable circulation around the eggs. The very small points of contact at the larger ends of the eggs and the very small line contact by holders 44 at the smaller ends of the eggs also assures that the necessary air circulation will exist when the egg incubator tray is in use.

When the eggs are rotated in the incubator tray, the fact that the higher end of the egg is slightly elevated above the lower, smaller end, and the angular disposition of the surfaces of the bands supporting the larger ends of the eggs, together with the slight angularity of the longitudinal axis of the egg are occasioned by the lateral displacement of the holders from the centerline between rollers, keeps the eggs always pressed very gently into the egg holders so they will not slip out.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An incubator tray comprising a frame having sides, an open top and an open bottom, a group of rollers, each roller comprising a spindle mounted for rotation in a pair of opposing sides, said spindles parallel and coplanar, means for rotating said spindles operatively connected with said spindles and for rotating the spindles in the same direction and at the same speed, each spindle having a plurality of spaced enlargements thereon, each enlargement having a band with a surface that is approximately the shape of a truncated cone, the bands of a pair of laterally adjacent spindles adapted to support the large end of one egg, a plurality of holders regularly spaced and partially encircling the smaller ends of the eggs, means mounting said holders in the space between spindles and slightly laterally spaced from the longitudinal centerline of the space between the spindles, and said holders being slightly lower than the points of contact support of the bands for the larger end of the egg so that the smaller end of the egg having its large end supported by said pair of bands is slightly lower than the larger end of the egg and so that as said spindles are rotated a small component force is applied onto the egg in a direction tending to move the egg inwardly of the holder.

2. An incubator tray comprising a frame having sides, an open top and an open bottom, a group of rollers, each roller comprising a spindle mounted for rotation in a pair of opposing sides, said spindles parallel and coplanar, means for rotating said spindles operatively connected with said spindles and for rotating the spindles in the same direction and at the same speed, each spindle having a plurality of spaced enlargements thereon, each enlargement having a band with a surface that is approximately the shape of a truncated cone, the bands of a pair of laterally adjacent spindles adapted to support the large end of one egg, a plurality of holders regularly spaced and partly encircling the smaller ends of the eggs, means mounting said holders in the space between spindles and slightly laterally spaced from the longitudinal centerline of the space between the spindles, and said holders being slightly lower than the points of contact support of the bands for the larger end of the egg so that the smaller end of the egg having its large end supported by said pair of bands is slightly lower than the larger end of the egg, and so that as said spindles are rotated a small component force is applied onto the egg and in a direction tending to move the egg inwardly of the holder said holders each comprising a curved bendable wire that forms an open pocket within which the smaller end of the egg is adapted to fit.

3. An incubator tray comprising a frame, a plurality of parallel rollers in said frame, each roller having a plurality of bands thereon, said bands being regularly spaced from each other, the bands on laterally adjacent rollers constituting a two-point contact support for the large end of an egg, the space between said laterally adjacent rollers having a longitudinal centerline, a plurality of holders for the small ends of eggs, said holders disposed slightly to one side of said centerline and in the spaces between said rollers, said holders located at a lower elevation than the said points of contact support of the band for the larger ends of said eggs so that the eggs disposed on said rollers and in said holders are downwardly tilted slightly and have axes of rotation which are slightly tilted from a horizontal plane, and rods in said frame beneath and transverse to said rollers and supporting said holders.

4. An incubator tray comprising a frame, a plurality of parallel rollers in said frame, each roller having a plurality of bands thereon, said bands being regularly spaced from each other, the bands on laterally adjacent rollers constituting a two-point contact support for the large end of an egg, the space between said laterally adjacent rollers having a longitudinal centerline, a plurality of holders for the small ends of eggs, said holders disposed slightly to one side of said centerline and in the spaces between said rollers, said holders located at a lower elevation than the said points of contact support of the band for the larger ends of said eggs so that the eggs disposed on said rollers and in said holders are downwardly tilted slightly and have axes of rotation which are slightly tilted from a horizontal plane, means connected to each of said rollers for rotating said rollers in the same direction and at a uniform speed between rollers, said bands having outer surfaces that are in the shape of a truncated cone with the smaller diameter portions thereof being closer to the egg holders with which they are associated than are the larger diameter portions of said band, said holders each comprising an upstanding arcuate wire member, and rods in said frame transverse to said rollers and supporting said holders in rows.

References Cited in the file of this patent

UNITED STATES PATENTS

| 1,081,870 | Shute | Dec. 16, 1913 |
| 1,156,374 | Shackelford | Oct. 12, 1915 |

FOREIGN PATENTS

| 459,745 | Germany | May 10, 1928 |
| 935,915 | France | Feb. 9, 1948 |
| 1,066,666 | France | Jan. 20, 1954 |